UNITED STATES PATENT OFFICE 2,494,565

PAINT COMPOSITIONS FROM CATALYTI-
CALLY CONJUGATED OILS

Arthur J. Lewis, Helen A. Moser, and John C.
Cowan, Peoria, Ill., assignors to the United
States of America as represented by the Secre-
tary of Agriculture No Drawing. Application June 4, 1946,
Serial No. 674,159

6 Claims. (Cl. 106—257)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to coating compositions containing conjugated oils, and in particular, to a method of improving certain film properties of these coating compositions. More specifically, it relates to a method of reducing tack in outside paints which are formulated from catalytically conjugated vegetable oils.

In patent application Serial No. 564,500, a method for improving the drying properties of vegetable oils by treatment with certain types of catalysts is described. These catalysts effect a shift of unsaturated bonds in the polyunsaturated acid radicals in glyceride oils from the non-conjugated to the conjugated position. One of the better catalysts which effects this improvement in drying properties is activated nickel supported on activated carbon black. Herein, this catalyst is referred to as nickel-carbon-catalyst, and the oils produced from it, as Norconol-S, with the S referring to the soybean oil, or as nickel-carbon-conjugated oils.

One of the main disadvantages of prior soybean oil paints is the tendency of the coatings to remain tacky for long periods of time. This phenomenon may be termed "residual tack" and is due to slow drying properties of soybean oil paints and it impairs the value of the coating, especially since dust and dirt adhere to the surfaces. Another disadvantage which characterizes prior soybean oil paints is the tendency of the coatings to soften and revert to a fluid or semi-liquid condition in environments of higher humidities and temperatures such as usually prevail during summer months. When softened thus, the coatings retain imbedded dust and dirt, and their durability is greatly reduced due to the stresses and strains produced by internal movements of the films. This phenomenon of softening may be termed "after-tack" and is more or less independent of the initial drying characteristics of the coatings. For example, a coating may dry rapidly with little or no residual tack, and subsequently develop after-tack to a considerable extent. Moreover, some coatings may show both residual tack and after-tack.

The residual tack may be so prolonged, and/or the "after-tack" develop so rapidly that the coating is not absolutely tack-free for periods of many months. Moreover, the after-tack, being a condition which occurs more readily under certain environmental conditions, as previously described, may recur after having disappeared.

Nickel-carbon-conjugated oils, when used in paint films, exhibit a greatly reduced period of residual tack as described in the copending application referred to previously. Nevertheless these coating have a marked tendency to soften or revert to a semi-fluid condition under conditions of higher atmospheric humidities and temperatures. This tendency is brought out by the results of our studies.

This tackiness of the paint films was shown readily by studies on the dirt collection of films prepared from paints containing alkali-refined soybean oil and Norconol-S. For example, panels coated with paints containing basic lead sulfate, leaded zinc oxide, carbonate white lead, and/or other pigments, such as titanium oxide, and alkali-refined soybean oil mixed with driers, and panels coated with similar paints containing Norconol-S oil, having approximately 28 percent conjugation, were exposed at 45° F. facing south for 30 days. The panels covered with paint films containing Norconol-S were much darker than the panels covered wih paint films containing alkali-refined soybean oil. It is reasonable to assume that this difference in darkness was caused by the difference in tackiness of the films on the panels. The films were cleaned, but with some of the pigments, it was impossible to wash enough dirt from panel to give a clean white film. However, on continued outdoor exposure for 30 more days, the cleaned films from the paints containing Norconol-S again became much darker and dirtier than the films from paints containing alkali-refined soybean oil. It is certainly evident that the nickel-carbon-conjugated soybean oil exhibited tack which did not disappear even after prolonged exposure. As the exposure of the panels was continued, the weathering of the film began to affect the amount of dirt adhering. However, with most pigments the Norconol-S films were still darker, after 12 months' exposure, than the films prepared with alkali-refined soybean oil.

We have discovered that this objectionable tackiness in the paints formulated from the nickel-carbon-conjugated soybean oil can be reduced substantially by the incorporation of calcium oxide or calcium hydroxide. Certain other oxides and salts of the alkaline-earth metals, and of the subgroup of group II in the periodic table and certain flatting agents, improve the dirt collection. However, most of these other materials which were tested, such as zinc, magnesium, and barium oxides, and calcium and aluminum stearates, were not as good as the calcium oxide or hydroxide in reducing the dirt collection. Although paints formulated with titanium oxide, without calcium oxide or other alkaline-earth oxides, began to show much reduced dirt collection after one year's exposure, the dirt collection in the first six months was very objectionable.

The improvement in dirt collection using calcium oxide was studied by substituting the calcium oxide or other material undergoing test for a portion of the pigment used. Paints containing 75 percent pigment by weight, and 25 percent oil by weight were prepared, using basic carbonate white lead as the main pigment with approximately one part of oil drier per 19 parts of oil, and 0, 2¾, or 5½ percent of calcium oxide, calcium stearate or aluminum stearate in pigment. Nickel-carbon-conjugated oils, non-break soybean oil, and raw linseed oils were used in the formulations. The driers used in these studies were lead and manganese. Paints were coated on conditioned cedar panels, and three coats were applied. Hunter reflectance readings were taken after 96 hours of interior exposure, and 9 days and 115 days of outdoor exposure. Table I shows the results of the reflectance measurements.

Table I.—*Comparative reflectance readings from white paint films*

|   |   | Nickel-carbon-conjugated soybean oil | | | Non-break soybean oil | | | Raw linseed oil | | |
|---|---|---|---|---|---|---|---|---|---|---|
|   |   | A | B | C | A | B | C | A | B | C |
| 1 | All BCWL [1] | 90 | 78 | 41 | 87 | 80 | 55 | 85 | 90 | 68 |
| 2 | BCWL+2¾ percent CaO | 88 | 90 | 65 | 90 | 88 | 58 | 82 | 90 | 68 |
| 3 | BCWL+5½ percent CaO | 86 | 92 | 63 | 87 | 90 | 58 | 83 | 90 | 63 |
| 4 | BCWL+2¾ percent Al. Stearate | 86 | 84 | 50 | 90 | 84 | 52 | 84 | 90 | 65 |
| 5 | BCWL+5½ percent Al. Stearate | 87 | 80 | 50 | 90 | 83 | 52 | 83 | 92 | 65 |
| 6 | BCWL+2¾ percent Ca Stearate | 90 | 81 | 45 | 92 | 82 | 50 | 88 | 91 | 62 |
| 7 | BCWL+5½ percent Ca Stearate | 88 | 82 | 48 | 90 | 82 | 50 | 85 | 94 | 60 |

Column A—Average of five readings taken before outdoor exposure of films; films air dried for 96 hours.
Column B—Average of five readings taken after outdoor exposure of films for nine days.
Column C—Average of five readings taken after outdoor exposure of films for 3 months and 24 days.
[1] BCWL—Basic carbonate white lead.

Prior to outdoor exposure, Norconol-S paints without added calcium oxide have higher reflectances than either of the comparable non-break soybean and linseed oil paints. On continued exposure for over three months, films of Norconol-S paints, with only basic carbonate of white lead as a pigment, have the lowest reflectance values of any of the paints in this series, indicating the presence of tack in the films caused by a softening or reversion to a semi-fluid condition. Norconol-S paint films containing 2¾ or 5½ percent of calcium oxide as pigment were substantially better in dirt collection than comparable paints from non-break soybean oil after three months' exposure as measured by reflectance. The reflectance values for the Norconol-S paints containing calcium oxide were approximately equal to that of raw linseed oil paints containing basic carbonate of white lead. Interestingly enough, calcium oxide did improve reflectance of the non-break soybean oil paints, but it did not improve the reflectance values of raw linseed oil paints.

Similar paints were prepared using barium, calcium, zinc, and magnesium oxide to the extent of 5½ percent of the pigment used which was basic carbonate white lead. Again the paint panels were prepared with comparable paints from nickel-carbon-conjugated soybean oil, non-break soybean oil, and raw linseed oil.

Table II.—*Comparative reflectance readings from white paint films containing metallic oxides*

|   |   | Nickel-carbon-conjugated soybean oil [1] | Non-break soybean oil | Raw linseed oil |
|---|---|---|---|---|
| 1 | All BCWL | 34 | 48 | 64 |
| 2 | BCWL+5½ percent BaO | 60 | 58 | 64 |
| 3 | BCWL+5½ percent ZnO | 56 | 63 | 68 |
| 4 | BCWL+5½ percent MgO | 68 | 61 | 61 |
| 5 | BCWL+5½ percent CaO | 65 | 61 | 61 |

[1] All readings are averages of five readings taken after outdoor exposure of films for three months and six days.

Table II shows how the films of Norconol-S containing 5½ percent magnesium oxide or calcium oxide were much superior in the reflectance measurements to the other films and to the control containing no added oxide.

Table III.—*Comparative reflectance readings from white paint films of Norconol-S*

|   |   | Nickel-carbon-conjugated soybean oil [1] | |
|---|---|---|---|
|   |   | A | B |
| 1 | All BCWL | 59 | 49 |
| 2 | CaO refined nickel-carbon conjugated soybean oil plus basic carbonate white lead | 50 | 44 |
| 3 | BCWL+½ percent CaO | 62 | 48 |
| 4 | BCWL+1 percent CaO | 67 | 47 |
| 5 | BCWL+2 percent CaO | 78 | 52 |
| 6 | BCWL+5½ percent CaO | 81 | 68 |
| 7 | BCWL+11 percent CaO | 80 | 62 |
| 8 | BCWL+5½ percent ZnO | 70 | 55 |

[1] Columns A and B are averages of five readings taken after outdoor exposures of 1⅙ and 5 months, respectively.

Table III shows how reflectance values of these paint films change with the increase in percentage of calcium oxide in the pigment. Apparently, a maximum in reflectance value of the films tested in this series occurs at approximately 5½ percent calcium oxide.

Comparisons should not be made between the reflectance values in the three tables, since they report on reflectances obtained from outdoor exposure made under slightly different conditions, and the dirt collection should not be expected to be uniform at different periods during the year.

The following examples taken from Kass, Radlove, and Cowan application Serial No. 564,500, filed November 21, 1944, referred to above, illustrate the preparation of the nickel-carbon catalysts and the nickel-carbon-conjugated soybean oil.

*Example I*

192 grams of nickel formate are dissolved in 5,500 ml. of hot, distilled water. The solution is filtered and added to 210 grams of activated carbon. A suitable activated carbon may be prepared from sulfite wastes resulting from sulfite-pulping process by burning at 900° C. followed by neutralizing the resulting carbon with hydrochloric acid, and copiously washing it to remove excess acids, salts, and other impurities. This suspension is evaporated by boiling until a 25 to 50 percent moisture content is obtained. The catalyst composition is then ready for activation by reduction with hydrogen.

*Example II*

116 grams of nickelous nitrate are dissolve in 160 ml. of distilled water and thoroughly ground with 105 grams of activated carbon. The mixture is added slowly to a solution of 68 grams of ammonium carbonate in 400 ml. of water, mixed, and filtered. The filter cake is washed with 200 milliliters of distilled water, dried at 100° to 150° C., and ground to a fine powder. The catalyst composition is then ready for activation by reduction with hydrogen.

The catalyst compositions may be activated by reduction with hydrogen in the following manner:

*Example III*

24 grams (dry weight basis) of catalyst composition, prepared by the method of Example I, are placed in a 500 ml. three-neck round-bottom flask fitted with a Hershberg stirrer constructed of nichrome wire, an inlet gas tube reaching as close to the bottom of the flask as possible, a funnel with a stopcock, a thermometer, and a gas outlet tube. Hydrogen is passed over the catalyst composition, and the temperature raised rapidly to about 360° C. The composition is then stirred intimately with the hydrogen at 360°±40° C. for two hours. The hydrogen is replaced with carbon dioxide, and the flask and contents are cooled to below 170° C. The catalyst may be used immediately or stored in vegetable oil under carbon dioxide, nitrogen, or other protective gas. In the reduction of the nickel in the catalyst, other types of apparatus can be used, but proper precautions must be observed to obtain intimate contact between catalyst composition and the hydrogen and to exclude oxygen.

As ilustrative of the manner in which our process of conjugation may be carried out, the following examples are given. In these examples, conjugation is given in percentages obtained by the use of ultraviolet absorption data from pure materials and from the isomerized oils by use of a Beckman spectrophotometer. For diene conjugation, the absorption of 9,11-octadecadienoic acid $$E_{1\,cm.}^{1\%} = 1150$$

at a wave length of 2300 A. was used as a standard. On a percentage basis, 9,11-octadecadienoic acid contains 100 percent diene conjugation and 0 percent triene conjugation. Pure 9,12-linoleic acid has an absorption of the order of $$E_{1\,cm.}^{1\%} = 1$$

at a wave length of 2300 A., which can be regarded as negligible in the calculations. For triene conjugation, the absorption of α-eleostearic acid (9,11,13-octadecatrienoic acid) which is $$E_{1\,cm.}^{1\%} = 1850$$

at a wave length of 2700 A. was used as a standard; the absorption of 9,12,15-octadecatrienoic acid is too low to make any appreciable effect on the percentages.

For analysis, a 25 mg. sample of isomerized oil was diluted to 25 ml. with non-absorbing solvent, and the absorption of the solution determined in a Beckman spectrophotometer. In an absorption of 300 at 2300 A. and 150 at 2700 A. were obtained, the percentages of conjugation would be 26.1 diene and 8.1 triene, respectively. The values given are not corrected for the difference between equivalent weights of glyceride and conjugated acids used for standards. However, this difference presumably is partially compensated by slight differences in the absorption of conjugated isomers produced by our catalyst.

The contact between the catalyst and the reactant may be accomplished by any suitable means that will effect intimate mixture, such as agitation or by causing the liquid material to flow through, or to be in contact with, the catalyst which may be adequately packed or maintained on supports in suitable apparatus.

*Example IV*

To 24 g. of the catalyst prepared as in Example I or III is added 200 g. of soybean oil, and the reaction mixture is heated at a temperature of 180°–190° C. for 6.0 hours. The reaction mixture was then cooled and filtered. The refractive index is increased by 0.0063, viscosity from 0.5 to 1.00 poise at 25° C. and the color remains 3 (Gardner scale). Analysis by means of the Beckman spectrophotometer indicates 31.3 percent diene and 1.8 percent triene conjugation.

*Example V*

To 25 g. of the nickel-activated carbon catalysts (prepared as in Example II or III) is added 300 g. of soybean oil, and the reaction mixture is heated at a temperature of 178°–180° C. for 4.0 hours. The reaction mixture was then cooled and filtered. The refractive index is increased by 0.0067, and the viscosity increased from 0.5 to 0.85 poise at 25° C. The color before the conjugation was 10, while after it was 2 (Gardner scale). Analysis by means of the Beckman spectrophotometer indicates 32.3 percent diene and 2.6 percent triene conjugation.

Having thus described our invention, we claim:

1. A paint mixture consisting essentially of basic carbonate white lead pigment; soy bean oil that has been conjugated by treatment in the presence of nickel-carbon catalyst; the said lead pigment and oil being in the weight ratio of about 3 of pigment to 1 of oil; paint drier; and calcium oxide in the proportion of 2¾ percent to 11 percent of the basic carbonate white lead.

2. The paint mixture of claim 1 in which the calcium oxide is present in the proportion of 5½ percent of the basic carbonate white lead.

3. A paint mixture consisting essentially of basic carbonate white lead pigment; soy bean oil vehicle conjugated by treatment in the presence of nickel-carbon catalyst; a paint drier; a reflectance improving substance taken from the group consisting of oxides and hydroxides of alkaline-earth metals and magnesium in the proportion of 2¾ to 11 percent of the basic carbonate white lead the said lead pigment and oil being in the weight ratio of about 3 of pigment to 1 of oil.

4. A paint mixture consisting essentially of a pigment; soybean oil that has been conjugated by treatment in the presence of a nickel-carbon catalyst; a paint drier; a reflectance improving substance taken from the group consisting of oxides and hydroxides of alkaline-earth metals and magnesium in an amount 2¾ to 11 percent of the said pigment the said pigment and oil being in the weight ratio of about 3 of pigment to 1 of oil.

5. The paint mixture of claim 4 in which the reflectance improving substance is calcium hydroxide.

6. The paint mixture of claim 4 in which the reflectance improving substance is magnesium oxide.

ARTHUR J. LEWIS.
HELEN A. MOSER.
JOHN C. COWAN.

REFERENCES CITED

The following references are of record in the file of this patent:

UNITED STATES PATENTS

| Number | Name | Date |
|---|---|---|
| 1,074,364 | Horn | Sept. 30, 1913 |
| 1,277,425 | King et al. | Sept. 3, 1918 |
| 1,852,761 | Sulecio | Apr. 5, 1832 |
| 2,044,292 | Grady | June 16, 1936 |
| 2,358,623 | Burr | Sept. 19, 1944 |

OTHER REFERENCES

Gregory: "Uses and Applications of Chemicals and Related Materials," vol. I, page 141.